United States Patent
Kraft et al.

(10) Patent No.: US 9,922,052 B1
(45) Date of Patent: Mar. 20, 2018

(54) CUSTOM IMAGE DATA STORE

(71) Applicant: A9.com, Inc., Palo Alto, CA (US)

(72) Inventors: Adam Wiggen Kraft, Mountain View, CA (US); Himanshu Arora, Sunnyvale, CA (US); Max Delgadillo, Jr., Santa Clara, CA (US); Sunil Ramesh, San Jose, CA (US); Atul Kumar, Sunnyvale, CA (US)

(73) Assignee: A9.com, Inc., Palo Alto, CA (US)

( * ) Notice: Subject to any disclaimer, the term of this patent is extended or adjusted under 35 U.S.C. 154(b) by 149 days.

(21) Appl. No.: 13/871,907

(22) Filed: Apr. 26, 2013

(51) Int. Cl.
G06K 9/00 (2006.01)
G06F 17/30 (2006.01)

(52) U.S. Cl.
CPC .............................. *G06F 17/30277* (2013.01)

(58) Field of Classification Search
None
See application file for complete search history.

(56) References Cited

U.S. PATENT DOCUMENTS

| | | | |
|---|---|---|---|
| 2009/0070415 A1* | 3/2009 | Kishi et al. | 709/203 |
| 2009/0074300 A1* | 3/2009 | Hull et al. | 382/209 |
| 2010/0030578 A1* | 2/2010 | Siddique | G06Q 10/0637 705/3 |
| 2011/0038512 A1* | 2/2011 | Petrou et al. | 382/118 |
| 2012/0166435 A1* | 6/2012 | Graham | G06F 17/30017 707/728 |

* cited by examiner

*Primary Examiner* — Weiwen Yang
(74) *Attorney, Agent, or Firm* — Hogan Lovells US LLP

(57) ABSTRACT

Various embodiments provide a user with a capability to customize multiple image data stores, where each data store can be used to provide content tailored to different users having different interests, setting, or notification demands. For example, users can submit images and modify processing parameters to tune an image matching system to their, or their customer's, individual desires. Accordingly, content can be delivered to a computing device in response to a query image sent by the computing device to a matching system containing the customized image data stores. The delivered content can be related to, or derived from, an image in a respective data store that matches the provided query image.

16 Claims, 6 Drawing Sheets

CUSTOM IMAGE DATA STORE

BACKGROUND

Users are increasingly utilizing electronic devices to obtain and process various types of information. For example, a user wanting to learn the name of a song playing in the background can cause a sample of that song to be recorded by an electronic device and uploaded to a song identification service for analysis. Similarly, a user wanting to determine the availability of a book can capture an image of the book and upload that image to a book identification service for analysis. As technology evolves and as the features and services offered on portable computing devices evolve and expand, it can be advantageous to adapt not just how information is presented to users, but also how users obtain and interact with that information.

BRIEF DESCRIPTION OF THE DRAWINGS

Various embodiments in accordance with the present disclosure will be described with reference to the drawings, in which.

DETAILED DESCRIPTION

Figure 1:
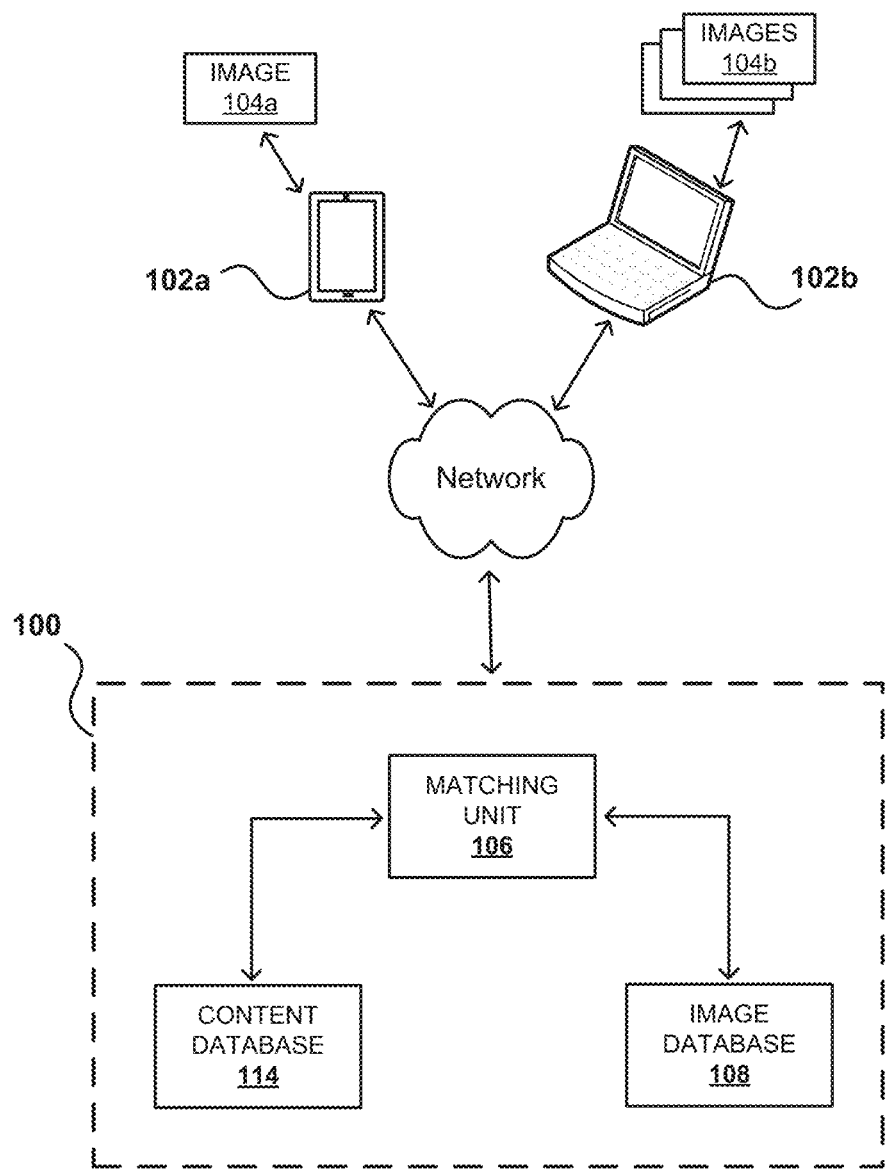
FIG. 1 illustrates an example system for providing image processing and content delivery in accordance with at least one embodiment.

Systems and methods in accordance with various embodiments of the present disclosure may overcome one or more of the aforementioned and other deficiencies experienced in conventional approaches to providing users with content. In particular, various approaches provide a user with a capability to customize multiple image data stores, where those data stores can be used to provide content tailored to different users having different interests, setting, or notification demands. For example, users can submit images and modify matching and/or processing parameters to tune an image processing system to their, or their customer's, individual desires. In one example, content is delivered to a computing device in response to a query image sent by the computing device to a processing system or service. The delivered content can be related to, or derived from, an image in an image data store that matches the provided query image. Embodiments can also include a transaction interface for receiving the image and delivering the content to the computing device. To make this process more flexible, embodiments can also include a database interface for enabling a user or content provider to update the image data store, such as updating the contents, and any appropriate settings, parameters, or alerts associated therewith.

In at least one embodiment, an enrollment request received from a user or content provider is required to enroll the user with a custom image matching system (CIMS). Upon enrollment, the user is associated with a first image data store to which the user can upload images. In one example, the user will upload images of a first subject or type, such as if the user or content provider is a department store, the first image data store could be for new clothing arrivals. In this example, a request for a second image data store is received from the user. In response, the system can provide the user with access to a second data store for which to upload images of a second subject or type. In this example, the department store may wish to upload images of sale items. Further, the user is provided by the system with the capability to modify each of the data stores at any time by adding additional images or deleting existing images. The user may additionally request access to additional image data stores, and delete old data stores in order to, in this example, provide third-party users or department store customers with up-to-date images that accurately reflect their current inventory.

Accordingly, CIMS can receive query images from a third-party user, on behalf of the department store, that are associated with the content within the first or the second data stores. For example, if a third-party user is interested only in sale items, in one example, they could specify searching the second data store. In another example, if the user is interested in all red clothing, they could specify both the first and second data stores and any other data store with other articles of clothing.

In at least one embodiment, the teaching herein could be incorporated as a browser application that could allow users to create a custom image processing environment for themselves that runs in the background while a user browses the web. In this example, a user could submit their own images and create custom rules and alerts that would run while they are visiting web pages. For example, a user could submit images of clothes they would like to purchase and create a rule that alerts them when they visit a web page that contains an image that is "visually similar" to an image they submitted. In another example, a user could submit logos of companies for products that are interested in. Accordingly, as the user browses an electronic marketplace, the browser application could collect images that contain the uploaded logos and alert the user. Therefore, in this example, the query image would be submitted by the browser application and matched against the images uploaded by the user automatically without the user's intervention.

Millions of images can be indexed in a image match system, which can enable any user to submit images in an attempt to find matches therein. A Custom Image Matching System (CIMS) can, therefore, be provided that allows for a specialized image matching and/or processing capability for different users that each have different desires, needs, preferences, interests, and the like. Utilizing such a system, users can submit their own images and modify many parameters for them to tune the custom image matching system to their desires. In one example, the system can be distributed and allow for threaded access through the use of a locking mechanism.

In one example, a user can create many data stores, each of which can be different including a different set of images and custom parameters for each of those sets. The system can be multi-threaded; thereby enabling each data store to have several replications of the same set of images and custom parameters. For example, first user could create two data stores—one data store called "Cereal" which contains images of cereal boxes, and another data store called "Birds", which contains images of birds. Conceptually there are only two data stores, but there could be multiple instances of both the "Cereal" and "Birds" data store, so that multiple commands may be executed at a given time.

Various other functions and advantages are described and suggested below as may be provided in accordance with the various embodiments.

FIG. 1 illustrates an example a block diagram of an image processing system 100 for providing customized image matching and/or processing for each user, in accordance with at least one embodiment. In this example, image processing system 100 communicates with computing devices, such as computing devices 102a and 102b, that either have a camera integrated therein or are capable of receiving and transmitting images and media content. Although a smart phone and laptop are shown, it should be understood that various other types of electronic or computing devices that are capable of determining and processing input can be used in accordance with various embodiments discussed herein. These devices can include, for example, tablet computers, desktop computers, personal data assistants, electronic book readers, video gaming controllers, and portable media players, among others.

In one example, computing device 102a captures images through its camera and sends them to image processing system 100. These captured or received images can include images of a particular product, a newspaper article, a movie poster, or any other image that can be captured through the camera of computing device 102a or can be received or obtained by computing device 102b. In at least one embodiment, image processing system 100 provides content relating to the received images to a respective computing device 102a or 102b. Examples of such content include additional images, retail inventory information, related products, video clips, audio clips, and the like.

In order to obtain content for a product, the user of the computing device 102a can capture an image of the product through the camera of the device and send the same through a network to the image processing system 100. For example, the user of computing device 102a may be interested in obtaining related products to a favorite pair of shoes. Therefore, the user captures an image 104a of the shoes through the camera of computing device 102a and sends the same as a query image to image processing system 100 for matching.

When query image 104a is received, image processing system 100 compares the received query image 104a with a designated subset of the images stored in an image database 108, as will be discussed elsewhere herein. Image database 108 stores a plurality of images from a content provider in a plurality of data stores, and the corresponding content for each image can be stored in content database 114. To compare the received query image 104a with the designated subset of the images in image database 108 are sent to a matching unit 112. Once a match has been found for the query image 104a, matching unit 112 determines the corresponding content associated with query image 104a and sends the content from content database 114 to computing device 102a.

In order to provide customized image processing for each user, users can submit their own images to the image database 108 and modify matching and/or processing parameters to tune the image processing system 100 to their, or their customer's, individualized needs or desires. In order to provide customized image processing, an enrollment request is made by a user or content provider through the computing device 102b, in this example. Upon enrollment, the user can be associated with a first customizable data store, as described in FIG. 2, as part of the database 108 to which the user can upload images. In one example, the user will upload images of a first subject or type and make a request for a second customizable data store. In response, the image processing system 100 can provide the user with access to the second data store for which the user can upload images of a second subject or type. Additionally, the user can be provided with the capability to modify each of the data stores at any time by adding additional images or deleting existing images. The user may additionally request access to additional custom data stores, and delete old data stores in order to, in this example, provide a third-party user, or customer, with up-to-date images and searchable image subsets.

In accordance with various embodiments, each data store can have a different combination of matching and/or processing parameters, settings, or alerts. For example, the user can edit or specify processing parameters for each data store that are different from one data store to another. The processing parameters, in this example, can at least include color similarity, shape similarity, face detection, face recognition, logo recognition, text recognition, a number of feature points to be extracted, threshold levels, and the like. The user can additionally modify the processing parameters or a combination thereof as the user's needs or requirements change or evolve.

Figure 2:
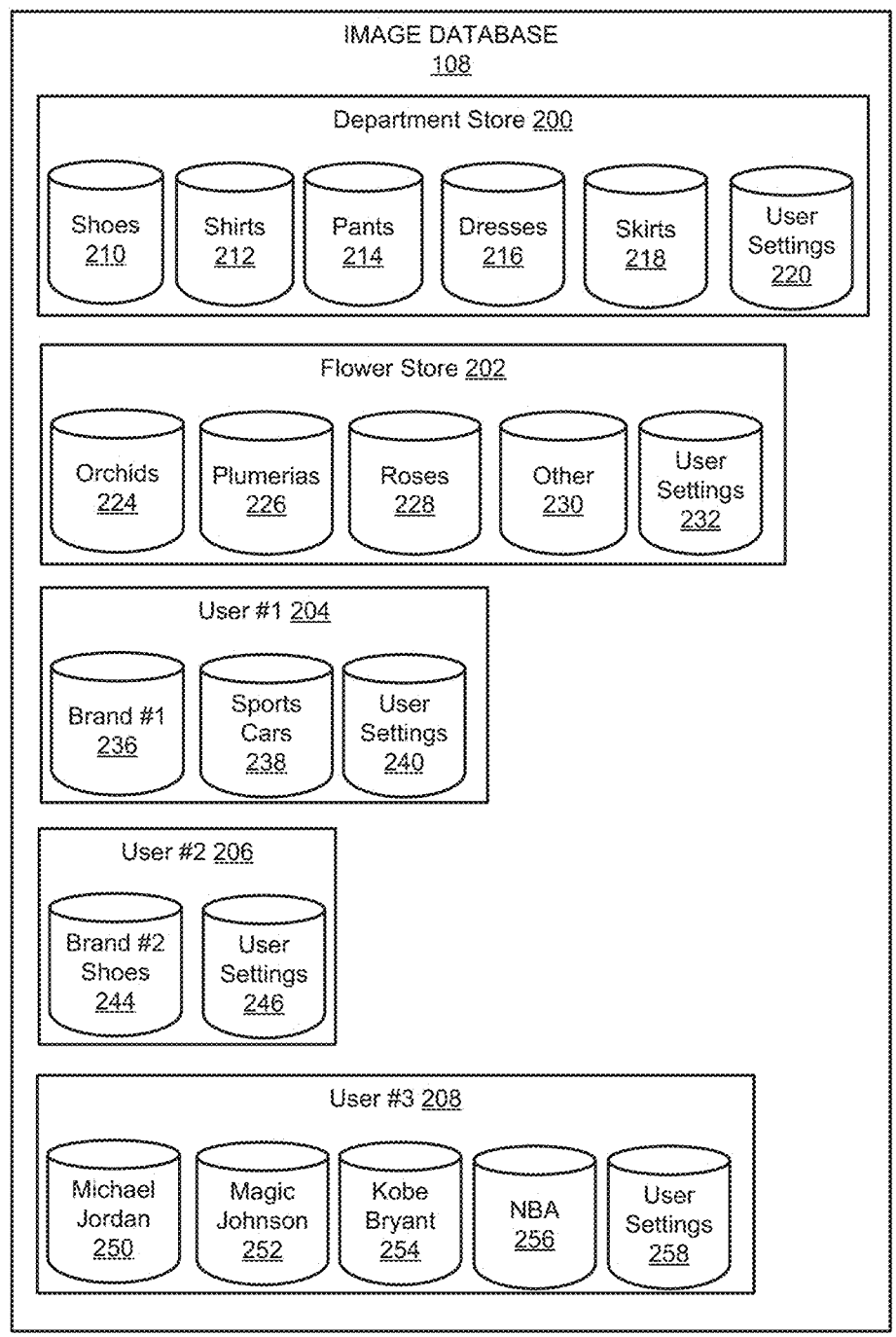
FIG. 2 illustrates an example image data store in accordance with at least one embodiment.

FIG. 2 illustrates an example image database 108 providing customized image data stores for matching content tailored to different users with different interests, setting, or notification demands, in accordance with at least one embodiment. In this example, the image database 108 includes multiple registered users each with one or more custom data stores for their individualized content and settings desires. The registered users, in this example, include Department Store 200, Flower Store 202, individual User #1 204, individual User #2 206, and individual User # 208.

In this example, the Department Store 200 includes multiple custom data stores each for different articles of clothing. For example, the Department Store 200 has created a shoes data store 210 to store images of shoes being sold by the Department Store 200 that are currently in stock. Accordingly, a third-party user can capture an image 104a of their favorite pair of shoes and submit the same to image processing system 100 to compare features on their favorite pair of shoes with images of shoes stored in the shoes data store 210. In this example, the content database 114 could provide the third-party user with inventory information for multiple pairs of shoes currently in stock. The third-party user may also be provided with the capability to purchase a pair shoes from the Department Store 200 that were provided by the content database 114. Accordingly, the Department Store 200 also has custom data stores for shirts 212, pants 214, dresses 216, and skirts 218 each of which third-party user s could run queries against. Further, in this example, the Department Store 200 also includes a user settings data store 220 which can include information, such as parameters that affect local feature descriptors of the images while indexing or querying a respective custom data store. For example, the user or content provider could specify the minimum and maximum features that should be extracted from data store images. Different values will affect the time it takes to provide image to a respective custom data store, the time it takes to query images, or the matching accuracy. Additionally, stored in the user settings store are the different combinations of processing parameters and settings for each of the custom data stores. Accordingly, the Department Store 200 can tune the default provided parameters specifically for their custom needs or solution in the user setting data store 220.

In this example, the Flower Store 202 (florist) includes custom data stores for customers to search their inventory of Orchids 224, Plumerias 226, Roses 228, and Other 230 assorted flowers. The florist 202 may operate a website and could create custom data stores for each of these flower types for an online flower catalog. Accordingly, a third-party user could submit a query image of their favorite flower to compare the same against one or more of these custom data stores to see which flowers look most similar in at least one aspect, such as shape, color, texture, or a combination thereof. In return, the third-party user can be provided with flower results that are similar in one or more aspects to the flower provided in the query image. Additionally, the florist 202 includes a user settings data store 232 for storing information, such as parameters affecting local feature descriptors, processing parameters and settings, and the like, as discussed with respect the Department Store 200.

Additionally, individual users can also enroll with the image processing system 100 to create their own custom data stores that are tailored towards smaller data sets that they themselves submit. In one example, the individuals could be bloggers posting pictures of particular subjects for visitors of their blog to search against. Additionally, individuals could store hundreds, if not thousands, of images for personal use and provide a query image to return similar images. For example, a user could have a custom data store for photos of friends. In this example, the user could create a setting for the friends photos data store that automatically runs a facial recognition routine of incoming query images. For example, if the user would like to find photos of their friend "Zan" saved in the data store to make a birthday flyer invite, the user could submit a query image of "Zan" and be returned all photos containing him based on recognizing his facial features in a number of images. Further, the user could create a setting that automatically runs a facial recognition routine on a set of images when the user uploads a photo album and a setting that automatically tags recognized faces with the names of people recognized therein. For example, a user could have a custom data store for photos of friends and family stored along with information for names associated with particular faces. Accordingly, when the uploads an new photo album, the data store could automatically tag each recognized person for a variety of purposes, such as sorting, searching, and the like.

Referring back to FIG. 2, User #1 234 has created two custom data stores, one for their favorite clothing Brand #1 236 and one for Sports Cars 238; User #2 242 has created one custom data store for Brand #2 Shoes 244; and User #3 248, a basketball fan, has created four custom data stores, one for Michael Jordan 250, Magic Johnson 252, Kobe Bryant 245, and a general NBA® 256 data store. Additionally, each of these users also has a user settings data store 240, 246, and 258, respectively, for store custom rules, alerts, and/or parameters, as discussed elsewhere herein.

In at least one embodiment, a browser application could be provided for enabling users to create a custom image identification/matching/processing environment that runs in the background (unnoticeable to the user) while a user browses the web. In this example, a user could submit their own images and create custom rules and alerts that would run while they are visiting web pages. For example, User #1 236 could submit images of clothes of Brand #1 that they would like to purchase, store them in the Brand #1 236 data store, and create a rule that alerts them when they visit a web page that contains an image that is "visually similar" to an image contained therein. Further, the user could create a rule to search for a particular shape and/or color of sports cars to compare against images in the Sports Cars data store 238. Similarly, User #2 242 could upload images of their favorite style of shoes and create rules for shape, texture, color, and/or logos in order to refine identification/matching/processing as User #2 browses the web.

In another example, User #3 248 could submit logos of their favorite NBA® teams in the NBA® 256 data store to be alerted of NBA® products or news. Then, as the user browses the web, such as navigating to a web page for an electronic marketplace, the browser application could scan images that contain the uploaded logos and alert the user. Accordingly, the browser application could perform facial recognition to match and recognize images of Michael Jordan, Magic Johnson, or Kobe Bryant against images stored in the respective data store. Therefore, in this example, the query image is submitted by the browser application and matched against the images uploaded by the user in a respective data store automatically without user intervention. Furthermore, other features could be added to aid such a custom browsing experience. For example, the user could add text tags to product images stored in a data store, such as tagging an image as "Red Brand #1 T-Shirt" or "Brown Brand #2 Boots".

As discussed above, the users of the image processing system 100 can create custom rules, settings, parameters, and/or alerts for each data store depending on the user's needs or the type of images contained therein. In one example, the parameters can affect the local feature descriptors of the images while indexing or querying a respective custom data store. In at least one embodiment, features are extracted from each image as they are uploaded to a custom image data store and stored therein. Accordingly, features are additionally extracted from each query image as they are received and compared to the extracted features of the images stored in a respective custom image data store. In one example, the features are extracted by applying a feature point detection algorithm, such as a Harris, FAST, FERNS, SIFT, or SURF algorithm.

In one example, the user or content provider could specify the minimum and maximum features that should be extracted from data store images. Different values will, accordingly, affect the time it takes to identify and match an image within a respective custom data store, the time it takes to query images, or the matching accuracy. Accordingly, other types of setting or processing parameters include image match, such as determining whether two images the same; logo matching logos in an image against those contained in other images, such as those on the web; color similarity matching between color values in two images; shape similarity to determine if two images have a similar outline shape; general similarity, which can include a combination of color and shape similarity; face detection for detecting faces in the images; face recognition for finding specific instances of faces within a custom data store; and text recognition. Accordingly, users can tune the parameters to specifically meet their custom solution. In at least one example, a tool where users can test images and system parameters can be provided to show the user how such parameters, when performed, will affect the matching, runtime, and other performance characteristics. In one example, such a tool could suggest parameters for the user, or a set of different options could be provided for the user to pick and choose from. Other types of matching criteria can also be applied within the scope of various embodiments.

In at least one embodiment, the user is provided by the system with the capability to modify each of the data stores at any time by adding additional images or deleting existing images. The user may additionally request access to additional image data stores, and delete old data stores in order to, in this example, provide third-party users with up-to-date images. For example, the system could enable a user to create, read (view), update, delete, list, and edit each of the images with a custom image data store or perform the same on the data stores themselves. These commands allow for persistent storage and interaction within a given data store. In one example, to execute commands, the user calls different URLs in a Representational State Transfer (REST)ful fashion. Each command can returns an XML response to the user, notifying a success or a failure. In such an example, the user may have to specify some extra inputs, or submit images using a POST request, depending on the command. Accordingly, other commands may at least include:

System Commands:
  List Data Stores—list all of the data stores in the system. In one example, this is specific to a particular user.
Data Store Commands:
  Create Data Store—create a data store to match against.
  View Data Store—view the information of a certain data store.
  Update Data Store—update the parameters of a data store. In one example, only query-time parameters are able to be changed while the data store contains images. Build-time parameters, which affect how new images are handled, can also be changed while the data store is empty (does not contain any images).
  Delete Data Store—remove a data store. In one example, this can only be done while a data store does not have images contained therein.
  Edit Data Store—returns a list of parameters that can are editable with the current state of the data store.
  Lock Data Store—put a given data store into the "locked" state. Some actions can only be performed while the data store is "locked".
  Unlock Data Store—put a given data store into the "unlocked" state. Some actions can only be performed while the data store is "unlocked".
Image Commands:
  Create Image—add an image into a specific data store.
  View Image—view information about a particular image in a particular data store.
  Delete Image—remove an image from a data store.
  List Images in Data Store—list all the images that are contained in a data store.
Query Commands:
  Query Image against Data Store—input an image and specify a data store as well as a "match type" parameter to match against the data store.

To ensure consistency in a multi-threaded environment, a lock data store command can be implemented. The user, in one example, can be required to lock a data store before altering the same, such as by adding or deleting images, deleting a data store, or updating data store parameters. Most other commands require the data store to be unlocked to ensure that the data store is in a stable state before performing actions such as listing the images in a data store or querying a data store, for example. Behind the scenes, Apache Zookeeper, in one example, can be used to implement the locking mechanisms in a distributed environment.

Figure 3:
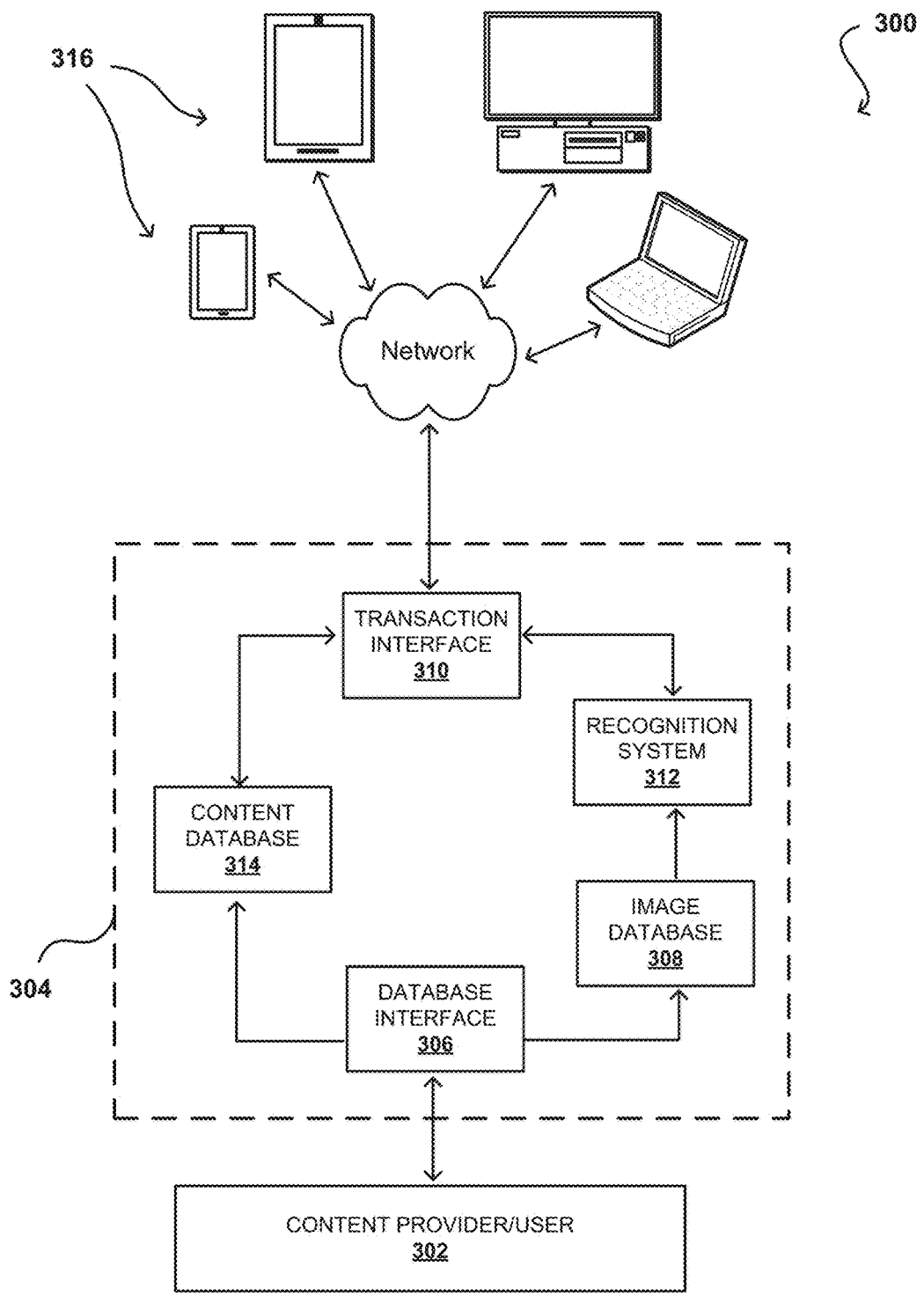
FIG. 3 illustrates an example system for providing image processing and content delivery in accordance with at least one embodiment.

FIG. 3 is a block diagram illustrating image matching environment 300 in accordance with at least one embodiment. Image matching environment 300 includes a database interface 306 that enables a content provider 302 to modify image database 308 and content database 314 of image matching environment 300.

Database interface 306 enables content provider 302 to create new custom image data stores as part of image database 308 and update content database 314 if applicable, and later modify the existing image data store or content database. Image matching environment 300 also includes a transaction interface 310 that can receive images from one or more computing devices 316 and send content to the same. As explained above, the user of a computing device can capture images through a camera. Alternatively, users of computing devices 316 can provide an image they encountered while browsing the Internet. Thereafter, users of computing devices 316 can send a query image to image matching environment 300 to obtain content related to the image. Thereafter, the image is received by transaction interface 310 of image matching environment 300. In this example, the transaction interface 310 sends the image to recognition system 312. In accordance with an embodiment of the present invention, transaction interface 310 and recognition system 312 are combined to form matching unit 106 described with respect to FIG. 1.

Figure 4:
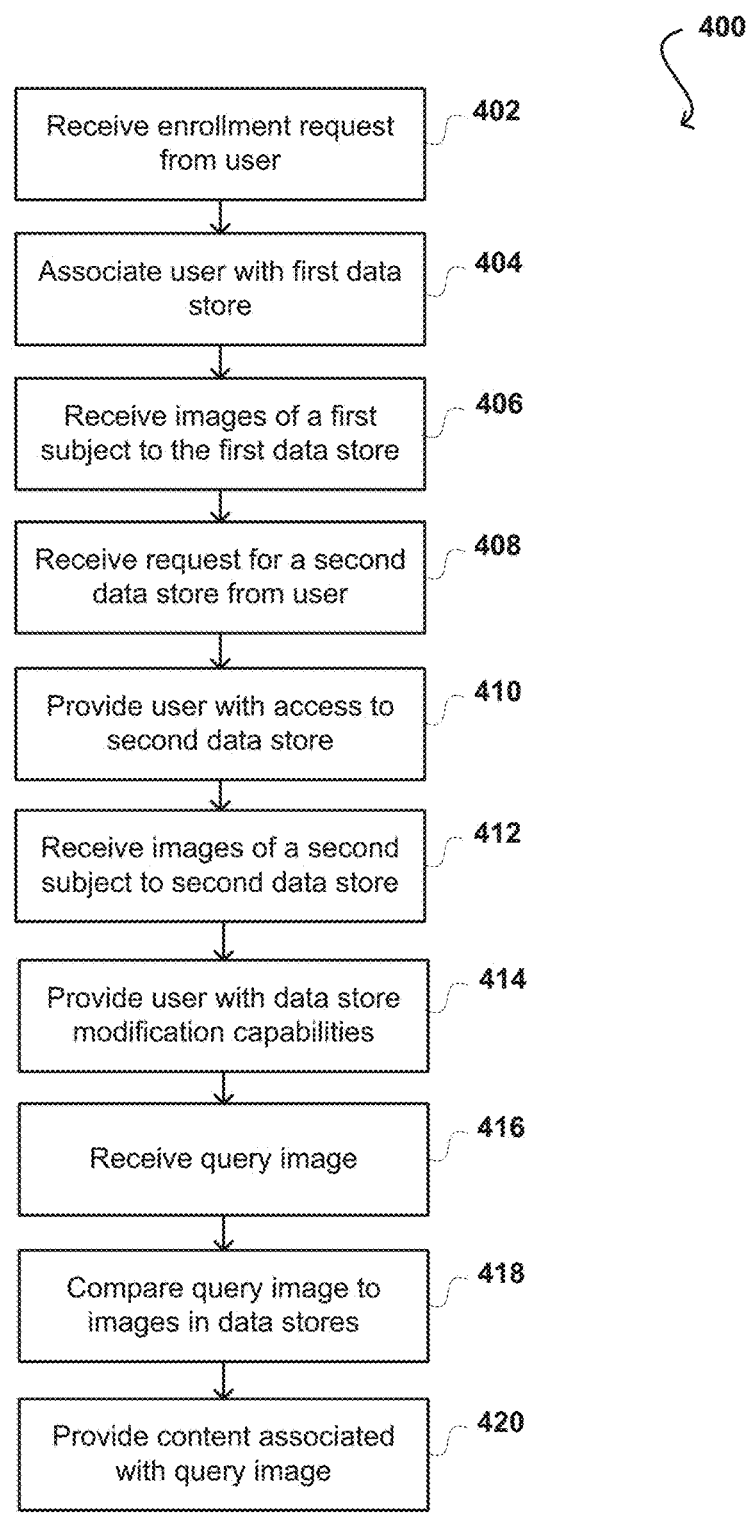
FIG. 4 illustrates an example process for providing one or more image data stores and processing images against the same that can be used in accordance with at least one embodiment.

FIG. 4 illustrates an example process 400 for providing customized image data stores for matching content tailored to different users having different interests, setting, or notification demands that can be used in accordance with various embodiments. It should be understood that, for this and other processes discussed herein, there can be additional, fewer, or alternative steps, performed in similar or alternative steps, or in parallel, within the scope of the various embodiments unless otherwise stated. In this example, an enrollment request is received 402 from a user or content provider. Once a user enrolls and is provided with an access code and security key, the user is associated 404 with a first image data store to which the user can upload images. Accordingly, one or more images are received 406 by uploading the images to the first image data store. In one example, a user will create or be provided with multiple custom image data stores each of which contain or are split by subject matter, type, matching parameter/settings, or a combination thereof.

Accordingly, a request for a second image data store is received 408 from the user. In response, the system provides 410 the user with access to a second data store for which to upload images associated with a second subject matter, type, matching parameter/settings, or a combination thereof. In this example, images of the second subject or type are received 412 and stored in the second data store. In various embodiments, the user is provided 414 by the system with the capability to modify each of the data stores at any time by adding additional images or deleting existing images. The user may additionally request access to additional image data stores, and delete old data stores in order to, in this example, provide third-party users or customers with up-to-date images that accurately reflect current inventory, trending news topics, or the like. Further, the user may also edit or specify matching parameters for each data store where a first set of matching parameters can be applied to images in the first data store and a different, second set of matching parameters can be applied to images in the second data store.

Subsequent to uploading images to at least one of the first or second custom image data stores, a matching system can receive 416 a query image from a third-party user, or from an application scanning content the user is currently viewing. The query image is subsequently compared 418 against one or more of the image data stores. In one example, the third-party user may select one of the first or second data stores to compare against the query image. In response to determining images in at least one of the first or second data store that match the query image by at least one matching criteria, the third-party user is provided 420 with the matching content. In one example, the user can edit or specify matching parameters or criteria for each of data store, which can at least include such criteria as color similarity, shape similarity, face detection, face recognition, logo recognition, text recognition, or the like. Further, different matching criteria can be used or applied by different data stores. Various other approaches can be used as well as discussed or suggested elsewhere herein.

As discussed elsewhere herein, the query image associated with the third-party user can be automatically provided by an application executing on a computing device of the third-party user, such as a browser add-on, when the third-party user navigates to a web page containing the query image. In this example, the application may scan and compare all images on pages that the user views to images uploaded by the user to one or more image data stores. In another example, the user is an administrator of a web page offering content, such as a blog or electronic marketplace, and the third-party user is a visitor to the web page. Further, users could create custom websites where they have custom image data stores and clients that use that website could perform custom matching on that website. For example, a florist website could create a data store of its flower catalog. Then users of that website could submit other images to see which flowers look most similar. Additionally, users could also create custom mobile applications that allow users to take pictures and match against the custom image data stores. Various other approaches can be used as well as discussed or suggested elsewhere herein.

Figures 5A, 5B:
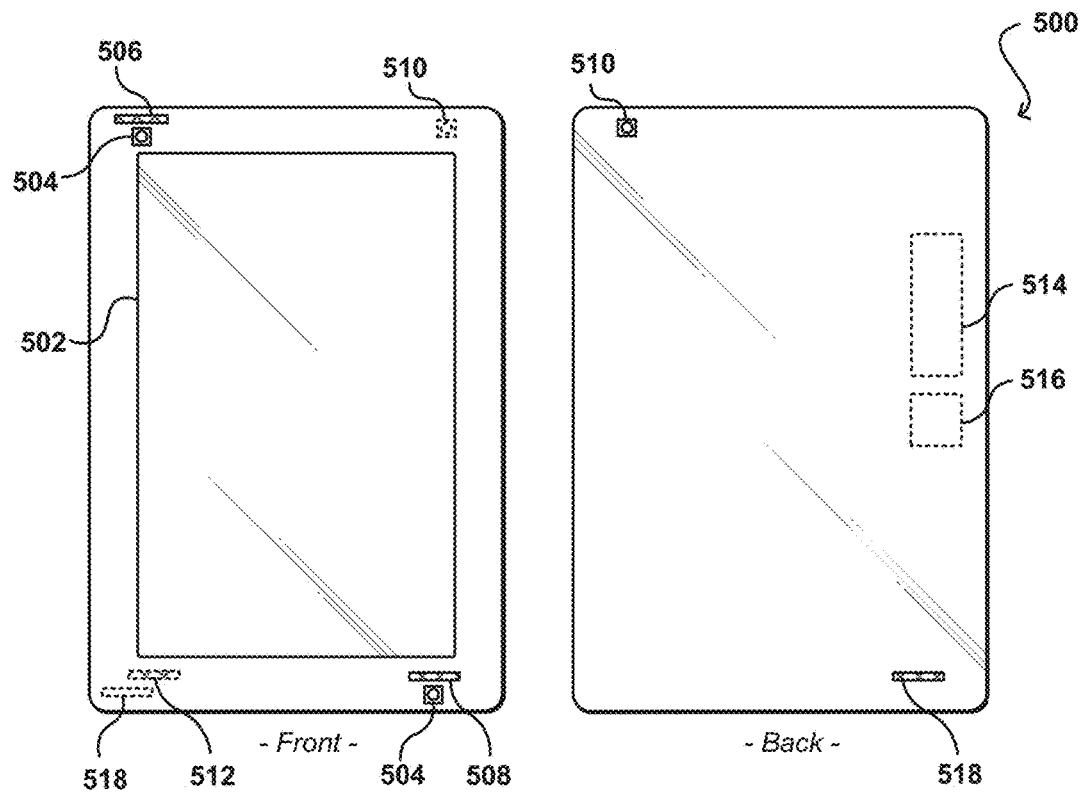
FIGS. 5A and 5B illustrate an example computing device that can be used to implement aspects of various embodiments.

FIGS. 5A and 5B illustrate front and back views, respectively, of an example electronic computing device 500 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 500 has a display screen 502 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 504 on the front of the device and at least one image capture element 510 on the back of the device. It should be understood, however, that image capture elements could also, or alternatively, be placed on the sides or corners of the device, and that there can be any appropriate number of capture elements of similar or different types. Each image capture element 504 and 510 may be, for example, a camera, a charge-coupled device (CCD), a motion detection sensor or an infrared sensor, or other image capturing technology.

As discussed, the device can use the images (e.g., still or video) captured from the imaging elements 504 and 510 to generate a three-dimensional simulation of the surrounding environment (e.g., a virtual reality of the surrounding environment for display on the display element of the device). Further, the device can utilize outputs from at least one of the image capture elements 504 and 510 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 508 on the front side, one microphone 512 on the back, and one microphone 506 on or near a top or side of the device. In some devices there may be only one microphone, while in other devices there might be at least one microphone on each side and/or corner of the device, or in other appropriate locations.

The device 500 in this example also includes one or more orientation- or position-determining elements 518 operable to provide information such as a position, direction, motion, or orientation of the device. These elements can include, for example, accelerometers, inertial sensors, electronic gyroscopes, and electronic compasses.

The example device also includes at least one computing mechanism 514, such as may include at least one wired or wireless component operable to communicate with one or more electronic devices. The device also includes a power system 516, such as may include a battery operable to be recharged through conventional plug-in approaches, or through other approaches such as capacitive charging through proximity with a power mat or other such device. Various other elements and/or combinations are possible as well within the scope of various embodiments.

Figure 6:
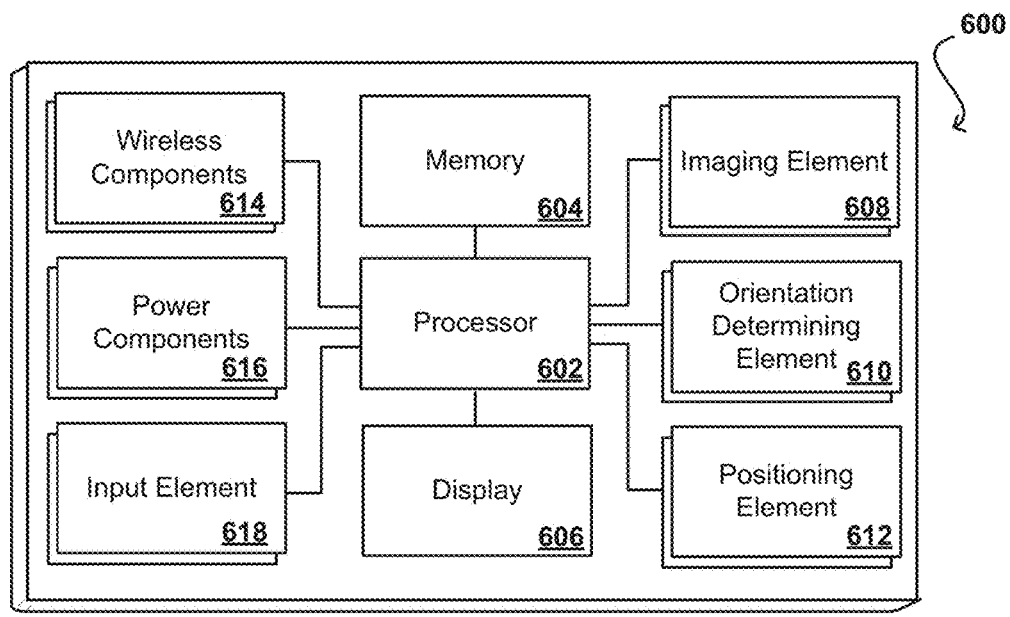
FIG. 6 illustrates example components that can be used with a device such as that illustrated in FIGS. 5A and 5B.

FIG. 6 illustrates a set of basic components of an electronic computing device 600 such as the device 500 described with respect to FIG. 5. In this example, the device includes at least one processing unit 602 for executing instructions that can be stored in a memory device or element 604. As would be apparent to one of ordinary skill in the art, the device can include many types of memory, data storage, or computer-readable media, such as a first data storage for program instructions for execution by the processing unit(s) 602, the same or separate storage can be used for images or data, a removable memory can be available for sharing information with other devices, and any number of computing approaches can be available for sharing with other devices.

The device typically will include some type of display element 606, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 608, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 600 also includes at least one orientation determining element 610 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 600. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 612 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 614 operable to communicate with one or more electronic devices within a computing range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 616, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 618 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

Figure 7:
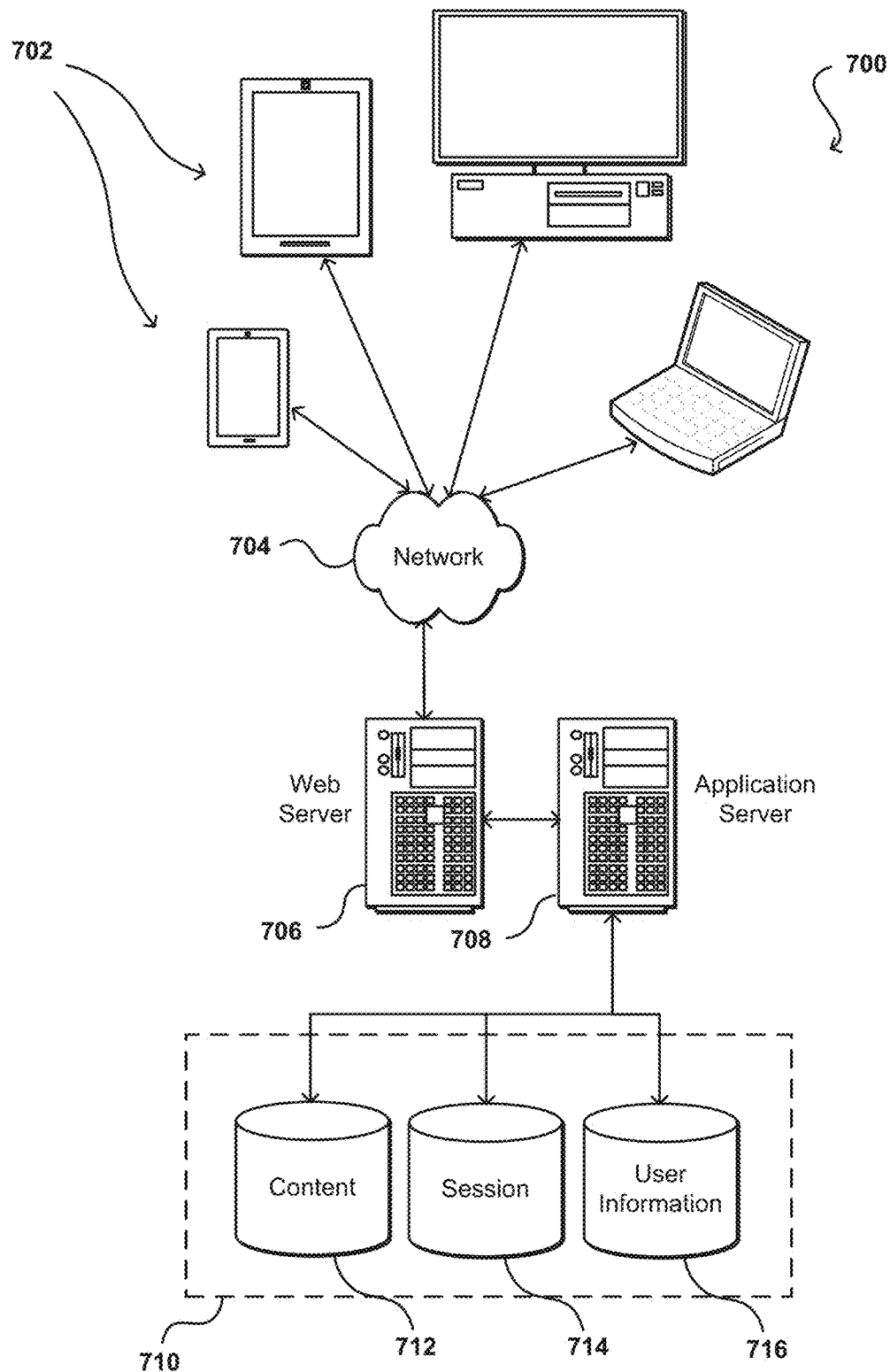
FIG. 7 illustrates an environment in which various embodiments can be implemented.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Computing over the network can be enabled via wired or wireless connections and combinations thereof. In this example, the network includes the Internet, as the environment includes a Web server 706 for receiving requests and serving content in response thereto, although for other networks, an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 708 can include any appropriate hardware and software for integrating with the data store 710 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 706 in the form of HTML, XML or another appropriate structured language in this example. The handling of all requests and responses, as well as the delivery of content between the client device 702 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing content (e.g., production data) 712 and user information 716, which can be used to serve content for the production side. The data store is also shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via computing links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared computing device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and computing media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving, from a first user operating a mobile electronic device, a request to create a first data store of an electronic marketplace, the first data store associated with a first subject, wherein the request to create the first data store is granted based at least in part on whether an access code or a security key is provided by the first user, and wherein the first data store is customizable with respect to the first user;
   granting the request to create the first data store based at least in part on whether an access code or a security key is provided by the first user;
   receiving, from the first user operating the mobile electronic device, a request to create a second data store of the electronic marketplace, the second data store associated with a second subject, and wherein the second data store is customizable with respect to the first user;
   receiving, from the first user, a first image representing the first subject, the first image captured by a camera of the mobile electronic device;
   receiving, from the first user, a second image representing the second subject, the second image captured by the camera of the mobile electronic device;
   storing the first image in the first data store, associated with the first subject;
   storing the second image in the second data store associated with the second subject, wherein the first data store and the second data store are separate data stores;
   storing a first matching parameter for the first data store and a second matching parameter for the second data store, the first matching parameter and the second matching parameter each associated with at least one alert, wherein at least one of the first matching parameter and the second matching parameter includes a color similarity parameter and a shape similarity parameter;
   receiving image query information, the image query information including one or more features, wherein the image query information is provided by an application executing on a computing device associated with a third-party user;
   comparing the one or more features of the image query information to images in at least one of the first data store or the second data store using the first matching parameter and the second matching parameter; and
   providing at least one image associated with the first subject retrieved from the first data store or at least one image associated with the second subject retrieved from the second data store to the third-party user, based on results of the comparison and based on the at least one alert.

2. The computer-implemented method of claim 1, wherein the first user is an administrator of a web page offering the content associated with the first or second subject to one or more visitors to the web page.

3. The computer-implemented method of claim 1, further comprising:
   receiving a request to modify the first data store or the second data store by adding additional images and deleting existing images, creating additional data stores, and deleting at least one of the first data store or the second data store.

4. The computer-implemented method of claim 1, wherein at least one of the first matching parameter and the second matching parameter includes a face detection parameter, a face recognition parameter, a logo recognition parameter, and a text recognition parameter.

5. The computer-implemented method of claim 4, wherein a first set of matching parameters associated with the first data store is different relative to a second set of matching parameters associated with the second data store.

6. The computer-implemented method of claim 1, further comprising:
   extracting features from each of the first image and the second image; and
   storing the extracted features for the first image in the first data store and the extracted features for the second image in the second data store.

7. The computer-implemented method of claim 6, further comprising:
   extracting features from the image query information, wherein comparing the image query information to images in at least one of the first data store or the second data store includes comparing the extracted features from the image query information to the extracted features of the first image and the second image.

8. A computer system comprising:
   a processor;
   a memory for storing instructions executable by the processor;
   a data store interface operable to, at least:
      receive, from a first user operating a mobile electronic device, a request to create a first data store of an electronic marketplace, the first data store associated with a first subject, wherein the request to create the first data store is granted based at least in part on whether an access code or a security key is provided by the first user, and wherein the first data store is customizable with respect to the first user;
grant the request to create the first data store based at least in part on whether an access code or a security key is provided by the first user;
receive, from the first user operating the mobile electronic device, a request to create a second data store of the electronic marketplace, the second data store associated with a second subject, and wherein the second data store is customizable with respect to the first user;
receive, from the first user, a first image representing the first subject, the first image captured by a camera of the mobile electronic device;
receive, from the first user, a second image representing the second subject, the second image captured by the camera of the mobile electronic device;
store the first image in a first data stores, associated with the first subject, and a second data store associated with the second subject, wherein the first data store and the second data store are separate data stores;
store a first matching parameter for the first data store and a second matching parameter for the second data store, the first matching parameter and the second matching parameter each associated with at least one alert, wherein at least one of the first matching parameter and the second matching parameter includes a color similarity parameter and a shape similarity parameter;
receive image query information, the image query information including one or more features, wherein the image query information is provided by an application executing on a computing device associated with a third-party user;
compare the one or more features of the image query information to images in at least one of the first data store or the second data store using the first matching parameter and the second matching parameter; and
provide at least one image associated with the first subject retrieved from the first data store or at least one image associated with the second subject retrieved from the second data store to the third-party user, based on results of the comparison and based on the at least one alert.

9. The computer system of claim 8, wherein the first user is an administrator of a web page offering the content associated with the first or second subject to one or more visitors to the web page.

10. The computer system of claim 8, wherein the instructions, when executed by the processor, further enable the computing system to:
receive a request to modify the first data store or the second data store by adding additional images and deleting existing images, creating additional data stores, and deleting at least one of the first data store or the second data store.

11. A non-transitory computer-readable storage medium storing instructions that, when executed by at least one processor, cause a computing device to:
receive, from a first user operating a mobile electronic device, a request to create a first data store of an electronic marketplace, the first data store associated with a first subject, wherein the request to create the first data store is granted based at least in part on whether an access code or a security key is provided by the first user, and wherein the first data store is customizable with respect to the first user;
grant the request to create the first data store based at least in part on whether an access code or a security key is provided by the first user;
receive, from the first user operating the mobile electronic device, a request to create a second data store of the electronic marketplace, the second data store associated with a second subject, and wherein the second data store is customizable with respect to the first user;
receive, from the first user, a first image representing the first subject, the first image captured by a camera of the mobile electronic device;
receive, from the first user, a second image representing the second subject, the second image captured by the camera of the mobile electronic device;
store the first image in the first data store, associated with the first subject;
store the second image in the second data store associated with the second subject, wherein the first data store and the second data store are separate data stores;
store a first matching parameter for the first data store and a second matching parameter for the second data store, the first matching parameter and the second matching parameter each associated with at least one alert, wherein at least one of the first matching parameter and the second matching parameter includes a color similarity parameter and a shape similarity parameter;
receive image query information, the image query information including one or more features, wherein the image query information is provided by an application executing on a computing device associated with a third-party user;
compare the one or more features of the image query information to images in at least one of the first data store or the second data store using the first matching parameter and the second matching parameter; and
provide at least one image associated with the first subject retrieved from the first data store or at least one image associated with the second subject retrieved from the second data store to the third-party user, based on results of the comparison and based on the at least one alert.

12. The non-transitory computer-readable storage medium of claim 11, wherein the first user is an administrator of a web page offering the content associated with the first or second subject to one or more visitors to the web page.

13. The non-transitory computer-readable storage medium of claim 11, wherein the image query information is automatically provided by an application executing on a computing device when the third-party user navigates to a web page containing the image query information.

14. The non-transitory computer-readable storage medium of claim 11, wherein at least one of the first matching parameter and the second matching parameter includes a face detection parameter, a face recognition parameter, a logo recognition parameter, and a text recognition parameter.

15. The non-transitory computer-readable storage medium of claim 11, wherein the instructions that, when executed by the at least one processor, further cause the computing device to:
extract features from each of the first image and the second image; and store the extracted features for the first image in the first data store and the extracted features for the second image in the second data store; and extract features from the image query information, wherein comparing the image query information to images in at least one of the first data store or the second data store includes comparing the extracted features from the image query information to the extracted features of the first image and the second image.

16. The non-transitory computer-readable storage medium of claim 11, wherein a third party user captures the image query information with a camera in a live field of view of a computing device, wherein the image query information is automatically provided for comparison to images in at least one of the first data store or the second data store by an augmented reality application executing on the computing device.

* * * * *